United States Patent [19]

Widergren

[11] 4,091,424

[45] May 23, 1978

[54] FACSIMILE COMPRESSION SYSTEM

[75] Inventor: Robert D. Widergren, San Jose, Calif.

[73] Assignee: Compression Labs, Inc., Campbell, Calif.

[21] Appl. No.: 770,021

[22] Filed: Feb. 18, 1977

[51] Int. Cl.² ............................................. H04B 7/12
[52] U.S. Cl. .................................... 358/260; 358/261
[58] Field of Search ....................... 358/260, 261, 263

[56] References Cited

U.S. PATENT DOCUMENTS 3,980,809 9/1976 Cook .................................... 358/261

Primary Examiner—Robert L. Richardson
Attorney, Agent, or Firm—David B. Harrison

[57] ABSTRACT

Disclosed herein is a data compression system for compressing binary facsimile data to reduce transmission times over standard telephone system circuits. At the transmit end of the circuit a segment of adjacent scans of, e.g., a white or light background document having, e.g., black typewritten characters or other symbols thereon is stored in a binary format in a buffer memory. A scanner scans the memory to locate the position of a beginning point of each individual character. A block definer circuit then defines a rectangular block closely enclosing the character. A block mapping circuit then scans the block following a predetermined pattern and provides a binary sequence of the black and white portions thereof. A run length encoder may then encode the binary sequence by run length or by Huffman code. A modem connected to the telephone lines sends data corresponding to the location, size and contents of each character block to a receiving modem at the receive end of the telephone circuit.

10 Claims, 9 Drawing Figures

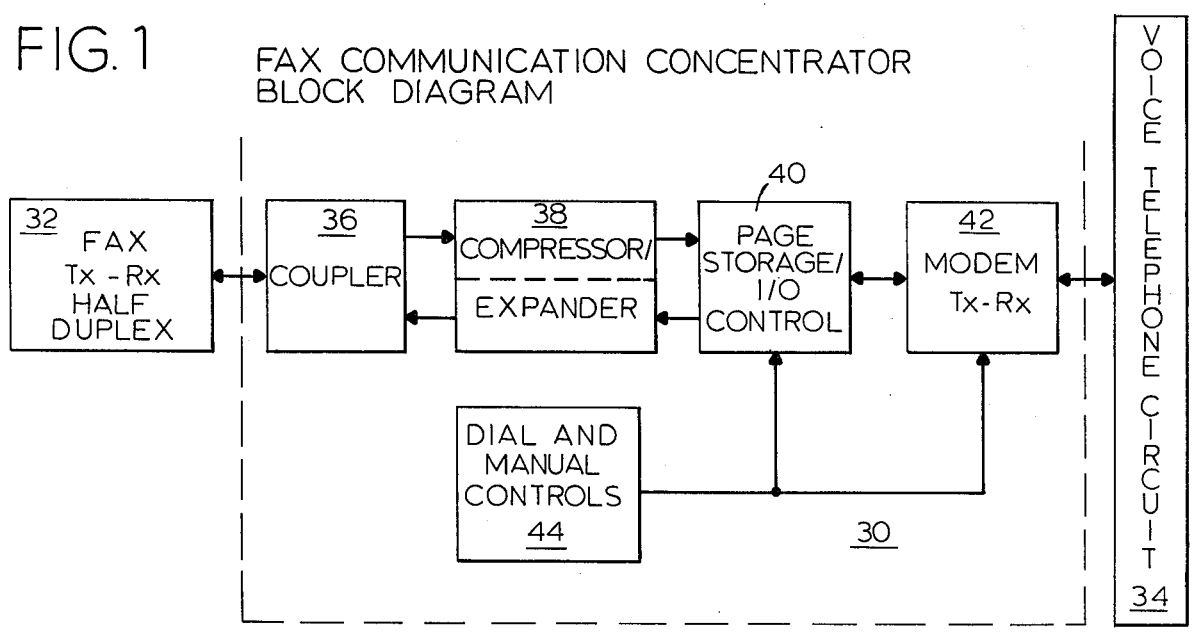
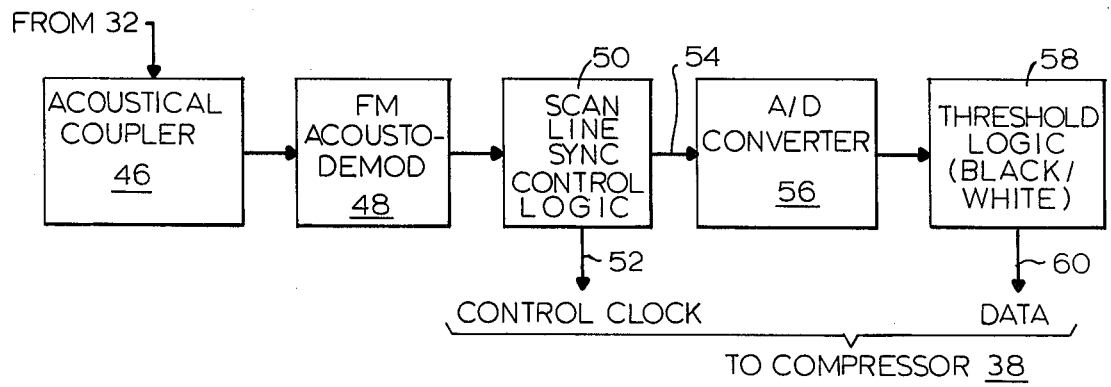
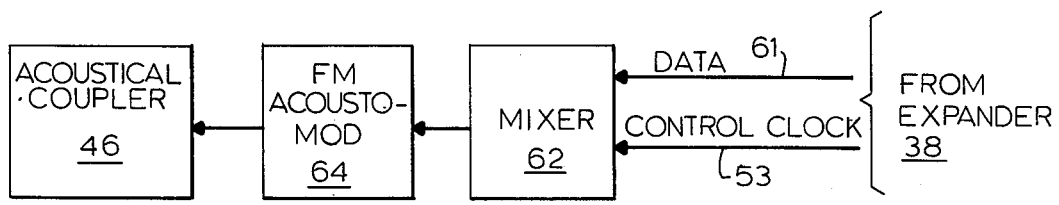

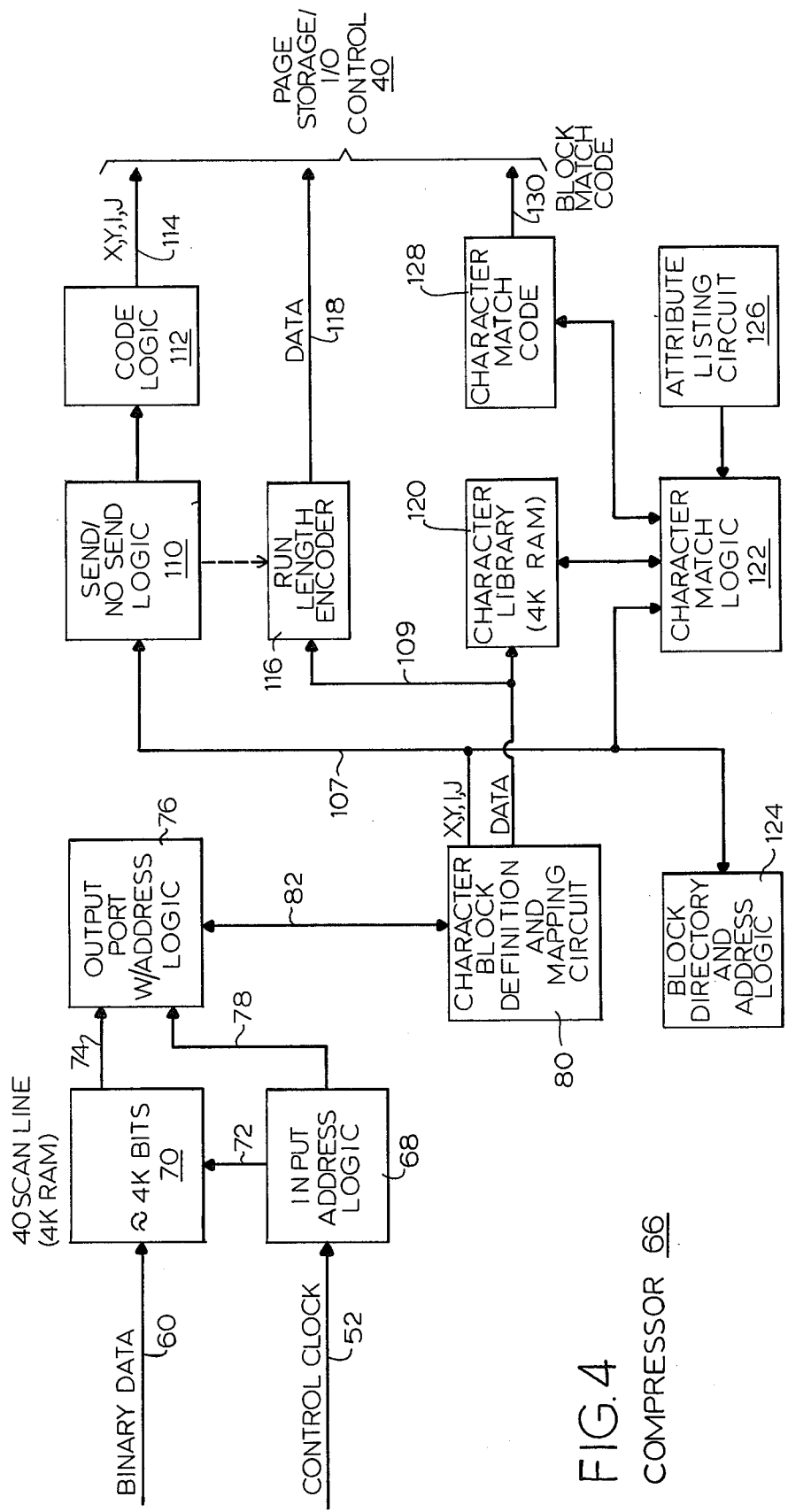

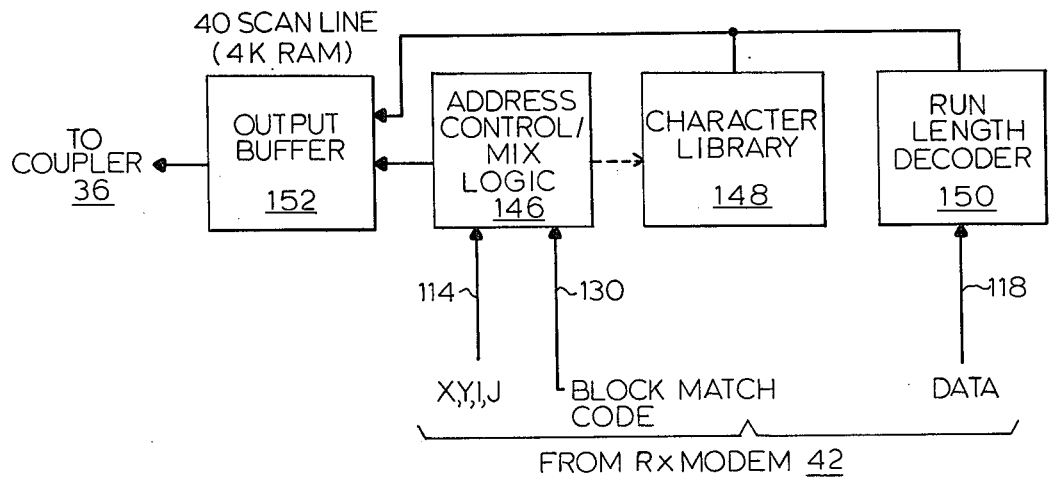
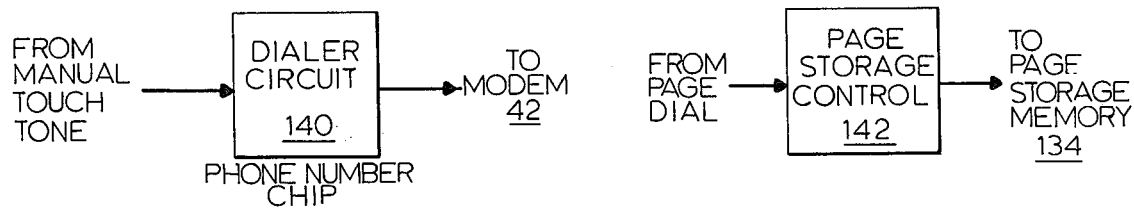
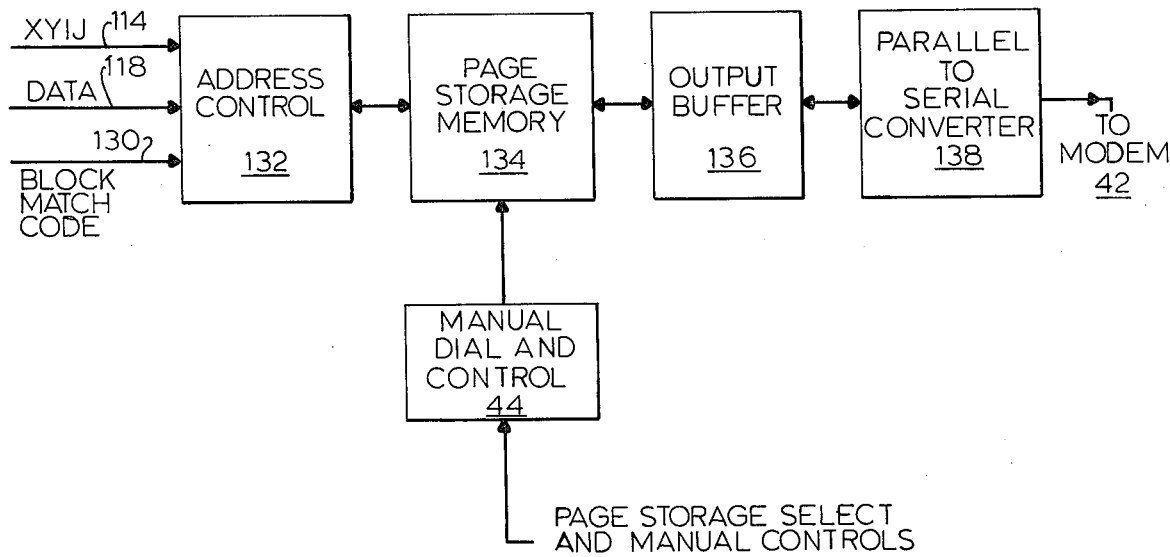

FACSIMILE COMPRESSION SYSTEM

BACKGROUND OF THE INVENTION

The present invention relates to facsimile data compression and more particularly relates to encoding and decoding apparatus and methods for shortening transmission times of binary facsimile data.

Facsimile systems which convert images of document originals into electrical signal and reconvert the signals into document copies are used on an increasingly widespread basis for document copy transmission via the standard telephone communications network. Electro-optical devices such as photodiodes are used to scan a document original along adjacent sequentially parallel scan lines. The light and dark areas of the document produce analogous electrical signals at the photo device, and these signals are shaped into binary format and then typically converted into a frequency modulated aural signal which is coupled directly into standard voice grade telephone circuits for transmission to a compatible facsimile receiver/reproducer at a distance. Depending upon such factors as the scan rate, horizontal and vertical resolution, signal format, etc., transmission times of such units have ranged from, e.g., one to twenty minutes per letter size page of document to be sent. For facsimile users having numerous pages of documents to send over long distance telephone circuits, the tolls on such calls have been the predominant cost and have impeded more widespread adoption and use of facsimile by business and government alike.

One prior art technique for reduction of the transmission times of facsimile data in binary format has been run length encoding. In that scheme each scan line was divided into a fairly substantial number of individual segments (e.g., 61 bits). Each scan line was made up of alternating stretches of zeros or ones, corresponding to light and dark regions along the scan line. By the run length encoding scheme, each unbroken stretch of zeros or ones was encoded by counting and sending only the number of zero or one segments therein. For example, one scan line might have had 4 white segments (picture elements, also known and referred to as "pixels") followed by 8 black segments, followed by 7 white segments, followed by 3 black segments, followed by 13 white segments, followed by 10 black segments, followed by 4 white segments, followed by 14 white segments, for a total of 61 segments and eight stretches for the entire line. Hexadecimal binary encoding of the number of segments for each stretch provided a run length code of 32 binary places for the eight stretches. Thus, for the foregoing example, run length encoding provided data reduction of almost two to one 32 binary places in lieu of 61). While a two to one data compression would reduce actual transmission time in half, a need for substantially greater data compression ratios has arisen to reduce further the overall transmission times and resultant long distance telephone system toils.

OBJECTS OF THE PRESENT INVENTION

An object of the present invention is to provide a system for the compression of binary facsimile data at ratios substantially greater than heretofore known.

Another object of the present invention is to provide a self-contained two part binary facsimile data compression system with one transmitting part placed between a standard facsimile transmitter and a standard voice grade telephone circuit and one receiving part placed between the telephone circuit and a standard facsimile receiver.

A further object of the present invention is to provide a self-contained two part binary facsimile data compression system with both parts adopted to provide transmission compression and reception expansion functions for half duplex operation.

A still further object of the present invention is to provide a self-contained two part binary facsimile data compression system that may be used directly with existing facsimile equipment without any modifications thereto.

Yet another object of the present invention is to provide a self-contained two part binary facsimile data compression system that is economically producible in quantity, that employs large scale integrated circuit semiconductor components for reliability in operation and convenience in maintenance, and that interconnects directly between unmodified standard facsimile equipment and voice grade telephone circuits.

SUMMARY OF THE INVENTION

The objects of the present invention, including the foregoing, are accomplished by a simplex or duplex binary facsimile data compression system for insertion between standard facsimile transmission equipments and a voice grade telephone circuit.

Compression apparatus of the present invention is placed between a facsimile transmitter and the telephone circuit and includes a buffer memory for storing in a binary format at least a segment of adjacent scans of a document to be sent, e.g., a white or light background letter size page having black characters typewritten thereon. A scanner is connected to scan the memory to locate an initial point of beginning of each individual character. A block definer circuit is then connected to the memory and functions to trace a rectangular block around the character. The block definer includes circuitry to provide a block of minimum area which closely surrounds the character. A mapping circuit connected to the memory then maps the black and white portions of the block following a predetermined scanning pattern to provide a binary sequence as an output block data signal for each character block. A run length encoder may be connected to the output of the mapping circuit to encode by run length the output block data signal. A transmission unit, such as a standard telephone system interface modem, is connected to the memory scanner, the block definer, and the mapping circuit (or run length encoder) to send over the telephone voice circuit encoded data providing the initial position, size dimensions and block data signal. An incremental position circuit in the transmission unit may be included to convert initial position data into incremental change of position data to reduce data size further, according to a reduction code, such as a Huffman code.

Expansion apparatus of the present invention is placed between the telephone circuit and a facsimile receiver which is complementary with respect to the facsimile transmitter. The expansion apparatus includes a detecting modem connected to the telephone circuit, a run length decoder, if run length encoding is used at the transmitting end, a signal restoration memory, a restoration memory scanner, and an output coupler. The signal restoration memory receives and stores temporarily each character block according to its location, size and block data signal. The restoration scanner then scans the restoration memory along the scan line format to provide a reconstructed binary facsimile signal in conventional format for the facsimile receiver unit.

The system of the present invention may also include page storage memory units at each end so that multiple pages of documents may be stored at the transmit end after compression and before transmission and may be stored at the receive end after reception and before expansion.

For additional compression this system may include a transmit library memory at the transmit end or storing initially scanned blocks of different individual characters. A receive library memory at the receive end is loaded with the same character blocks. Thereafter, a character identifier circuit at the transmit end compares each subsequently scanned block against the character blocks stored in the transmit library. Upon a parity detection, the character identifier circuit provides a library address to the transmission circuit which is sent in lieu of the block data signal. The library address signal addresses the receive library which then outputs the corresponding stored character block data in place of the unsent block data for that character. Periodically, such as with every new document page or oftener, the library memories will be remade in accordance with the initial procedure.

The method of the present invention includes the steps of data compressing for transmission by locating each individual character of a document to be sent by facsimile, isolating each character into a rectangular block drawn closely therearound, mapping the black and white portions of each block by scanning the area thereof according to a predetermined pattern to produce a binary block data signal transmitting only data corresponding to the location, size and binary block data signal for each block, and includes the steps of data expanding upon reception by recreating in memory storage a pattern corresponding to said document by placement therein of said blocks by location, size and block data signal, scanning said memory storage in accordance with conventional facsimile parallel scan line format to provide a restored facsimile output signal, applying the restored facsimile output signal to a facsimile receiver for facsimile reproduction of said document.

The method may include the additional steps of run length encoding and decoding of each binary block data signal, storing location, size and binary block data signals for character blocks for one or more pages, and creating from initial scanned character block data signals identical scanned character block data signals two identical libraries of different characters at both sending and receiving ends, comparing subsequently scanned blocks at the transmitting end with the transmit library to test for character match, in the event of a character match sending a library address in lieu of a block data signal and identifying each library address at the receiving end, applying the identified address to the receive library, and outputting therefrom to the memory storage the block data signal stored therein in place of the unsent block data signal which corresponds thereto.

BRIEF DESCRIPTION OF THE DRAWINGS

FIG. 1 is an overall system block diagram of one bidirectional half duplex device of the facsimile data compression system incorporating the principles of the present invention.

FIG. 2 is a block diagram of the coupler element of the FIG. 1 device, showing operation in the transmitting mode.

FIG. 3 is a block diagram of the coupler element of the FIG. 1 device showing operation in the receiving mode.

FIG. 4 is a block diagram of the compressor section of the compressor/expander element of the FIG. 1 device which illustrates its principles of operation in the transmit mode.

FIG. 7 is a functional block diagram of a page storage and input-output control element of the FIG. 1 device.

FIG. 8 is a functional block diagram of a dial and manual controls element of the FIG. 1 device.

FIG. 9 is a functional block diagram of the expander section of the compressor/expander element of the FIG. 1 device which illustrates the principles of operation in the receive mode.

DETAILED DESCRIPTION OF THE PREFERRED EMBODIMENT

Figure 5:
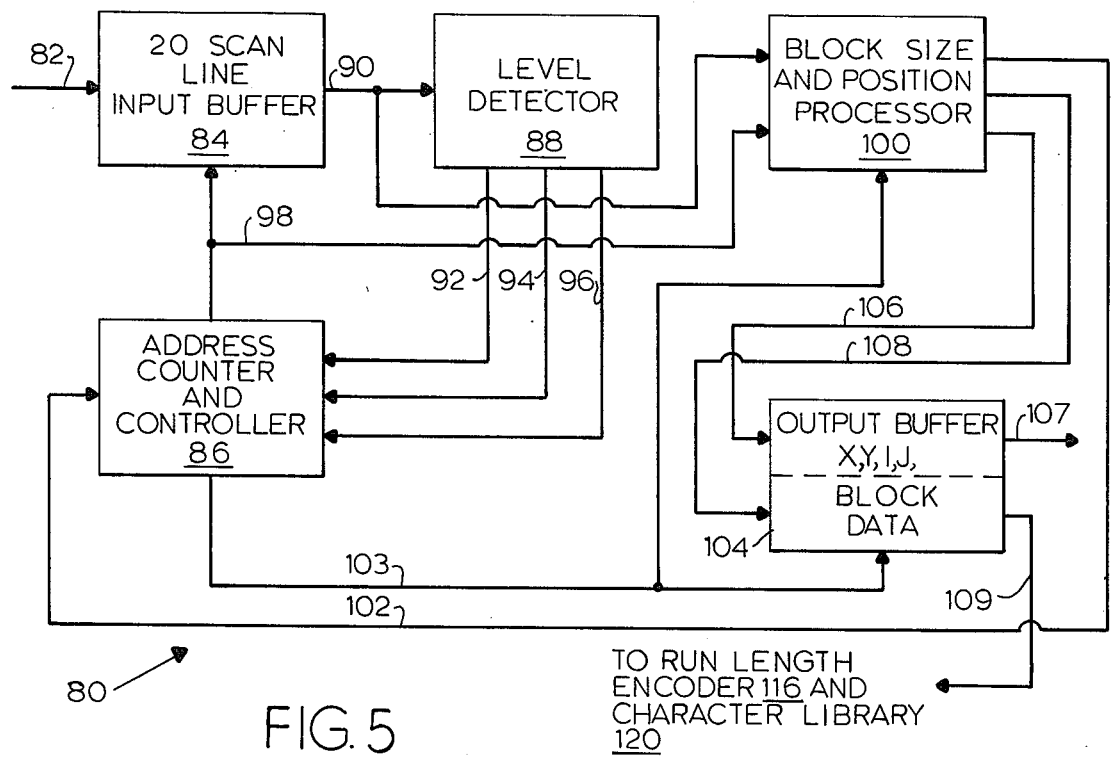
FIG. 5 is a block diagram of circuit elements of the character block definition and mapping circuit of the FIG. 4 compressor section of the device shown in FIG. 1.

Referring to FIG. 1, the binary facsimile communication system of the present invention incorporates two functionally identical devices 30. Each device 30 is capable of half duplex operation, i.e., it functions to compress binary facsimile data while operating in a transmitting mode and functions to restore such data by expansion while operating in a receiving mode. The devices 30 are placed between standard, commercially available half duplex facsimile units 32 and standard, dial-selected voice telephone circuit 34. Typically, the interconnection will be via audio coupling into telephone hand sets. Thus, a telephone hand set connected to a telephone unit of the voice telephone circuit 34 would be aurally coupled to the device 30 while a like hand set from the device 30 would couple to the facsimile equipment 32. Alternatively, a direct wire interconnection of the device 30 between the facsimile equipment 32 and the telephone circuit 34 is acceptable, although the use of aural coupling by hand set enables the devices 30 to be removed readily and the facsimile equipment 32 directly coupled to the telephone circuit 34 in the event that the binary facsimile compression system of the present invention is not going to be used.

Each device 30 includes a coupler 36 which is interconnected with a facsimile unit 32, a compressor/expander circuit 38 which is connected to the coupler 36, and page storage and in/out control circuit 40 which is connected to the compressor/expander circuit 38, and a telephone interface modulator-demodulator (modem) 42 which is itself connected to the page storage and in/our control element 40. The dial and manual controls circuit 44 is operatively connected to the page storage and in/out control circuit 40 and to the modem 42.

Referring now to FIG. 2, the coupler 36 is shown functionally in the transmit mode. The coupler 36 (transmit mode) includes an acoustical coupler 46 which receives acoustically a modulated FM signal from the facsimile equipment 32. While the devices 30 may be made to work with amplitude modulated facsimile signals, the increasing universal convention is an FM signal format. Such a format is reinforced by the adoption of EIA standards specifying such format. The received FM facsimile signal is sent from the coupler 46 into an FM acousto-demodulator 48 wherein the signal is restored to its original analog scan line format. An output of the demodulator 48 is provided as an input of a scan line sync and control logic circuit 50 which functions to separate synchronizing pulses corresponding to scan lines which are provided via a line 52 to the compressor/expander circuit 38 (as shown in FIG. 4, to be discussed hereinafter). The analog scan line data is supplied via a line 54 to a multiple bit analog to digital converter circuit 56. While a single bit converter would be functional in most situations, the use of a multiple bit converter is preferred; it enables the analog facsimile line data signal to be digitized into multiple bits per picture segment or pixel, in order to accommodate gray scale variations. Then, the digitized output of the analog to digital converter 56 is applied to a threshold logic circuit 58 which functions to establish a threshold for separating each multiple bit picture segment into a single bit black and white binary signal. The threshold logic circuit 58 will include a control to adjust the threshold level. The control may be accessible to enable an operator to establish the threshold at which the circuit will switch between gray tones to either black or white signals, or the control may be preset by the manufacturer. Alternatively, the control may be automatically variable and utilize automatic level control circuitry which has been adapted to respond to, and set the threshold level in accordance with, different greyscales resulting from e.g., various colors present as printing or background. In the present system, it is that black levels shall correspond to a binary one and white levels shall correspond to a binary zero. The binary facsimile signal from the threshold logic circuit 58 is output via a line 60 to the compressor element 38.

In FIG. 3 the coupler 36 is shown in its receive mode. Control clock signals via a line 53 and binary facsimile data via a line 61, both from the expander portion of the compressor/expander circuit 38, are provided as inputs to a mixer stage 62. The mixer stage 62 functions to restore scan line synchronizing pulses to the binary data signal to provide a composite binary facsimile signal including scan line synchronizing pulses as an output in proper facsimile format. The output of the mixer 62 provides a modulating input to an FM acousto-modulator circuit 64. The modulator circuit 64 provides an output of frequency modulated aural signals to the acoustical coupler 46 which in turn passes the signals to the facsimile unit 32 operating in the receive mode.

Turning now to FIG. 4, a compressor 66 subcircuit of the compressor/expander circuit 38 is shown in functional detail. The compressor 66 receives the control clock signal from the scan line sync control logic 50 via the lead 52 into an input address logic circuit 68, and simultaneously receives the binary facsimile data signal from the threshold circuit 58 via the lead 60 and stores the data in a buffer random access memory 70, which has a storage capacity for holding approximately 4096 bytes. With a 4096 byte (32K bit) capacity, the memory 70 is capable of storing binary data for approximately 40 scanning lines across a typical 8½ inch wide page at a standard resolution of 96 pixels per inch. The memory 70 is arranged so that data from each scan line is stored sequentially, and this sequential storing arrangement is accomplished by a "write" control signal from the input address logic circuit 68 via a lead 72. Also, the memory 70 is arranged as a stack so that data may be read at one end thereof as it is being loaded at the other end, and the operation of loading and unloading (writing and reading) goes on continuously. A "read" output from the memory 70 is provided via a line 74 to the input of an output port having address logic 76. The control clock signal via lead 78 is also provided to the output port 76.

The output port 76 unloads scanning line data from the buffer memory 70 and sends the data to a character block definition and mapping circuit 80 via a bus 82. The character block definition and mapping circuit 80 provides three distinct functions: First, it searches each incoming group of twenty scan lines to locate a beginning pixel of a character image to be sent; second, the circuit 80 scans the character horizontally in successive scanning lines in order to define and trace a rectangle of minimum dimensions around the character; third, the circuit 80 maps the contents in the rectangle it has defined to provide a binary data signal corresponding to the equivalent of the character.

One implementation of the character block definition and mapping circuit 80 is set forth in FIG. 5. The circuit 80 includes an input buffer 84 which holds each group of e.g., twenty consecutive scanning lines unloaded from the memory 70 and received via the bus 82. The buffer 84 is preferably arrayed as a 1096 bit by 20 memory matrix so that each scanning line has a unique address as does each pixel within each scan line.

Connected to the buffer 84 is an address counter and controller 86 which addresses the data locations of the buffer in a controlled sequence. Data stored at each addressed location of the buffer 84 is output to a level detector 88 via a line 90. The level detector 88 has three output lines 92, 94, and 96, all of which are connected as control inputs to the address counter and controller 86. The first line 92 signals the controller 86 that all data received at the level detector 88 are logical zeros (white pixels) for the scanning line and no logical ones (black pixels) have been detected. The signal on the control line 92 directs and enables the address counter and controller 86 to advance to the next scanning line, whereupon pixel address sequencing and level detection is repeated, scanning line by scanning line until a logical one pixel is detected.

Upon detection of a logical one (black pixel) a control signal is sent from the level detector 88 to the address counter and controller 86 via the second control line 94. The signal on the line 94 inhibits counting of the address counter and controller 86, and the address of the first-to-be-detected logical one pixel is sent via a bus 98 to a block size and position processor 100 where it is loaded into a horizontal position register. The address counter and controller 86 simultaneously sends the processor 100 a scan line identifier via the bus 98 which is loaded into a vertical position register.

Figure 6:
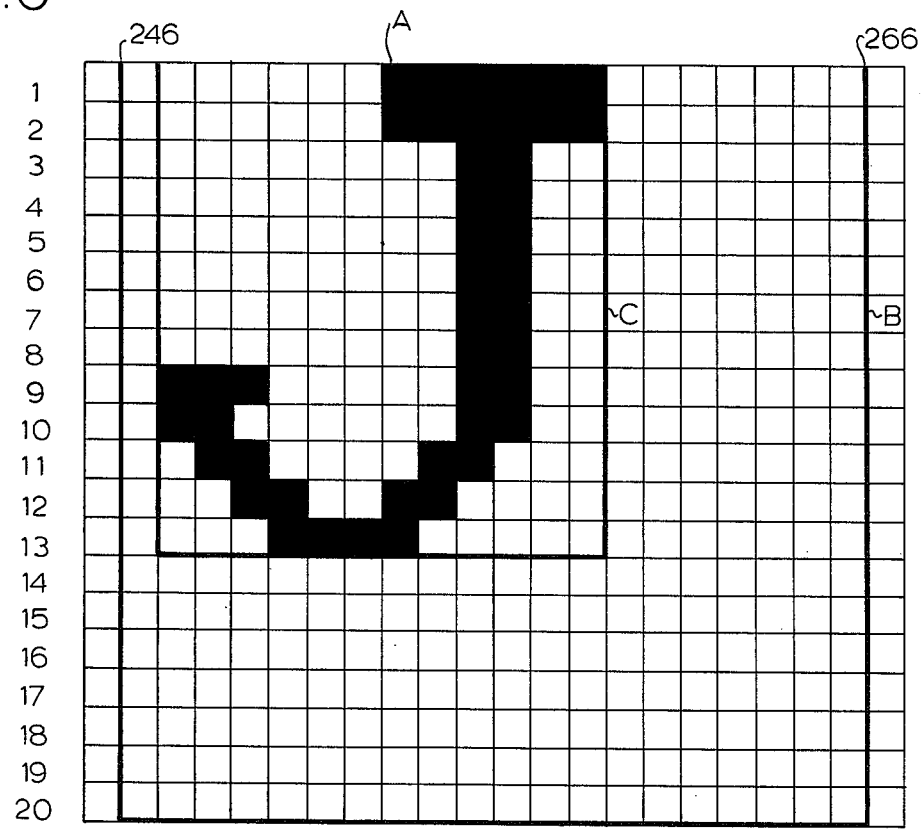
FIG. 6 is a graph representing visually one example character block undergoing definition and mapping by the character block definition and mapping circuit shown in FIG. 5.

The first-to-be-detected pixel of a character to be blocked and mapped is called the key pixel. A key pixel A is shown in the graph of FIG. 6 which depicts digitization of a facsimile signal for a capital J. In FIG. 6, the key pixel A was detected in the first scan line (scan line 1) at a horizontal pixel position "253" (which would be about a third of the distance across a typical business letter sized document). For the example shown in FIG. 6, the processor would store for the key pixel A the number "253" in the horizontal position register and the number "1" in the vertical position register. Then the processor 100 directs the address counter and controller 86 to resume sequencing via a control signal sent on a bus 102.

Sequencing along the scanning line is then resumed and continues so long as logical one (black) pixels are detected by the level detector 88. When the next logical zero (white) pixel is detected, a control signal is sent via the third bus 96 to the controller 86 whereupon sequencing pauses, and the horizontal address of the last black pixel is sent to the processor 100. In FIG. 6, the last black pixel for scan line 1 is located at position "258." This number 258 is stored in a block width factor register of the processor 100.

At this point, the processor 100 fixes a maximum size block around the black pixels detected in scan line 1. The maximum block B, shown in FIG. 6, is e.g., 20 pixels across and may be as much as e.g., 20 scanning lines down. The block B is located by the processor 100 so that the black pixels of scan line 1 which extend contiguously between locations 253 and 258 are centered horizontally within the block B, which is seen to extend in FIG. 6 from location 246 to location 266.

The block B defines a scanning region, and the processor 100 sends offsets to the address counter and controller 86 via the bus 102 so that subsequent sequencing along successive scan lines will be restricted horizontally between the locations 246 and 266, unless the location of the block B is later adjusted to accomodate the geometry of the character being blocked.

At the same time that the maximum block B is defined, a minimum block C will be defined by the processor. For scan line 1 of FIG. 6 the tentative minimum block size C would be six pixels across and one pixel down, beginning at horizontal location 253 of scan line 1 (the location of the key pixel A). The minimum block C will be expanded vertically and often horizontally as sequencing proceeds, but it will never be made smaller. Thus, it will be appreciated that the difference between the addresses in the block width register and the horizontal position register of the processor 100 will define in pixels the width of the minimum block C, and this absolute width value for the block is stored in a width register of the processor 100.

The following table sets forth the operation of the processor 100 in arriving at the final minimum size of the block C for the letter shown in FIG. 6. It is to be understood that the data block C is identified by the following four parameters:

$x$ = leftmost horizontal pixel corodinate (address) loaded in horizontal position register $y$ = uppermost starting scan line number loaded in vertical position register $i$ = width of the character in number of pixels loaded loaded in the width register $j$ = length of the character in number of scanning lines loaded in the length register data = number of black pixels scanned accumulated in an accumulation of the processor 100.

| TABLE FOR FIG. 6 CHARACTER | | | | |
|---|---|---|---|---|
| Scan Line Number | x | y | i | j | data |
| 1 | 253 | 1 | 6 | 1 | 6 |
| 2 | 253 | 1 | 6 | 2 | 6 |
| 3 | 253 | 1 | 6 | 3 | 2 |
| 4 | 253 | 1 | 6 | 4 | 2 |
| 5 | 253 | 1 | 6 | 5 | 2 |
| 6 | 253 | 1 | 6 | 6 | 2 |

-continued

| TABLE FOR FIG. 6 CHARACTER | | | | |
|---|---|---|---|---|
| Scan Line Number | x | y | i | j | data |
| 7 | 253 | 1 | 6 | 7 | 2 |
| 8 | 253 | 1 | 6 | 8 | 2 |
| 9 | 247 | 9 | 3 | 1 | 3 |
|   | 253 | 1 | 6 | 9 | 2 |
| 10 | 247 | 9 | 3 | 2 | 2 |
|    | 253 | 1 | 6 | 10 | 2 |
| 11 | 247 | 9 | 3 | 3 | 2 |
|    | 253 | 1 | 6 | 11 | 2 |
| 12 | 247 | 9 | 4 | 4 | 2 |
|    | 253 | 1 | 6 | 12 | 2 |
| 13 | 247 | 1 | 12 | 13 | 4 |
| 14 | 0 | 0 | 0 | 0 | 0 |

At the fourteenth scanning line in FIG. 6, the level detector 88 has sensed that there are no further black pixels that are contiguous with those in preceding scan lines. A signal is sent via the control line 92 to the address counter and controller 86, and it in turn signals the processor 100 via a bus 103 that the minimum character block has been defined. Hence, for the character shown in FIG. 6, the block C is defined by the thirteenth scan line of the table as $x = 247, y = 1, i = 12, j = 13$, and this information is loaded into an output buffer 104 from the processor 100 via a bus 106 in response to a control signal sent via the bus 103. At the same time, the processor 100 loads a block data matrix in the output buffer 104 with the black and white pixels within the block C via a bus 108.

The letter "J" shown in FIG. 6 is particularly useful in explaining the operation of the processor 100 in that beginning with scan line 9, two separated black pixel portions were detected, one of them (beginning at location 255) being contiguous with black pixels of prior scan lines, and the other of them (beginning at location 247) not so. The processor 100 treats the discontiguous segment as a separate character with its own blocks B' and C' until line 13 is sequenced wherein the black pixel portion thereof is found to be contiguous with both previously separate segments, and the minimum block C is then expanded horizontally by the processor 100 to accommodate what is now known to be the single character "J". Contiguity exists whenever a pixel in an immediately subsequent scan line is directly below or is diagonally adjacently below a pixel in an immediately preceding scan line.

The processor 100 may also involve an accumulator to accumulate the total number of black pixels found to be within the minimum block C. This total number is particularly useful in connection with character matching, to be explained in greater detail hereinafter.

It will be appreciated by inspection of FIG. 6 that the provision of a minimum block C around the character in place of the larger block B reduces the number of pixels to be transmitted from 400 to 156, a substantial initial data compression ratio.

In the event that a character is encountered by the block definition and mapping circuit 80 which exceeds the maximum block size of e.g., 20 pixels by 20 lines, that portion of such a character which is within the maximum block size will be blocked and mapped and the balance outside the block will be mapped as a separate block. An overflow register of the processor will be loaded with the horizontal pixel location at which point the oversize character exceeds the maximum block dimensional limit, and this information will be used in defining the block containing the overflow. In this way, signatures, lines, pictures, etc., are easily encoded by the compression system 30.

After the first character has been blocked and mapped by the circuit 80 shown in FIG. 5, it resumes scanning to locate another character, and when a key pixel of another character is located, the block definition and mapping circuit 80 repeats the operation described hereinabove for the exemplary character "J" shown in FIG. 6. Mapping continues until all pixel addresses of the 20 lines held in the line input buffer 84 have been scanned and tested by the level detector 88 and all characters therein have been mapped.

It is to be understood that the scanline buffer 84 interacts with the output port 76 of the memory 70 so that additional scan lines are sent to the buffer 84 whenever in mapping a character additional scan lines are needed to the maximum of e.g., 20 per character. In this way, characters may be completely mapped, even though they do not lie entirely within the original central 20 scan lines loaded into the buffer 84 of the block definition and mapping circuit 80.

Block definition data $x$, $y$, $i$, and $j$ leave the output buffer 104 via a bus 107, and block contour and mapping data leave the output buffer 104 via a bus 109. These data are sent to other processing circuits wherein further data compression occurs. These circuits will now be described.

Assuming that the character thus blocked (e.g., the character J shown in FIG. 6) is one of the initial characters of a page of facsimile to be sent via the unit 30, the $x$, $y$, $i$, and $j$ data is sent through a send/no send logic element 110 and a code logic circuit 112 which applies a Huffman coding scheme to the $x,y$ and $i,j$ signals to provide additional data compression. Huffman coding schemes have been known and used for many years and were first explained in an article by D. A. Huffman entitled "A Method for Constructing a Minimum Redundancy Code" in Proceedings of the IRE, Vol. 40, p. 1093, September, 1952.

The $x,y$ and $i,j$ signals are then sent via a lead 114 to the page storage element 40 of the unit 30. For this initial character block, the data thereof is passed through a run length encoder 116 which encodes the data by run length in conventional fashion. The run length encoded data from the encoder 116 is then sent to the page storage circuit 40 via a line 118. At the same time unencoded data from the character block definition and mapping circuit 80 is supplied as an input signal to a character library memory 120 where it is stored at predetermined address. The character library memory 120 is typically a random access memory having 4096 bytes of storage capacity. Connected to the character library memory 120 is a character matching logic circuit 122. Connected to the matching logic circuit 122 is a block directory and address logic circuit 124 and an attribute listing circuit 126.

The matching logic circuit 122, the block directory and address logic circuit 124 and the attribute listing circuit 126 cooperatively function with the character library memory 120 in accordance with information received from the character block definition and mapping circuit 80. The initial character blocks stored in the character library memory 94 are also stored in an identical library memory of the complementary unit 30 at the other end of the transmission path. Thus, the character library memory 120 of the compressor 66 provides a reference against which subsequent blocks are compared by operation of the character match logic circuit 122.

The character library 120 will be cleared typically at the beginning of a new page of facsimile or perhaps less often, depending upon the nature of the documents being sent by facsimile. If the documents are all typewritten or printed in the same type font, then it would not be necessary to clear the library with each page. Whether the library should be cleared can be automatically determined after several characters of a new page have been mapped. If those characters are matched with characters in the library 120, it is not cleared. If those characters do not match with stored characters, then the library 120 is cleared and reloaded. Loading and operation of the character library 120 and its related circuitry will now be described.

While the library 120 may be provided with a capacity to store every letter (upper and lower case), numeral, and symbol of a typewriter type font, that procedure would be counterproductive to the provision of optimized facsimile data compression. Consequently, it has been found that the storage of lower case letters only in the library works best. Thus, the library 120 will have at least a capacity to hold data, both block and mapping, for 26 or so characters.

During an initial loading operation, mapping data will be written into the library 120 from the mapping circuit 80 via the bus 109, and the block size and location data will also be separately recorded in the library memory 120 from signals sent via the bus 107. The library 120 continues to be filled with lower case letters (block sizes being typically eight pixels by eight scanning lines) until a character block is sent which matches with a character block already stored in the library 120. The match-up procedure will now be described.

First, the size $(i,j)$ of the incoming block is sent via the bus 107 to the character matching logic 122. If the incoming block size is within the limits set for blocks stored in the library 120, then the incoming block is screened further by the operation of the attribute listing circuit 126 which directs the character match logic 122 to compare the incoming blocks total black pixel count with total black pixel counts for each of the characters stored in the library 120. This step eliminates most, but not all, of the characters of the library 120 which do not match the incoming character block.

Comparison of other attributes complete the matchup of the incoming character block with its identical character block stored in the library 120. First, a vertical centerline scan and count of black pixels of the incoming block is made (the incoming block being temporarily stored in transient data storage locations of the library 120). The centerline black pixel count is compared with centerline black pixel counts of stored character blocks. This comparison separates, for example, "e" letters from "c" letters, but it will not separate, e.g., "b" letters from "d" letters or "p" letters from "q" letters.

A second attribute test may be made by comparing the number of white pixels preceding the key pixel of the block in the first scan line. This test will clearly distinguish "b"s from "d"s and "p"s from "q"s, etc.

A third attribute for comparison is a horizontal centerline scan and count of black pixels of the incoming character and the library characters against which this attribute is compared for parity detection. A fourth attribute for comparison is the calculation of the moment of inertia of black pixels of the incoming and reference characters about a vertical centerline axis of rotation; and a fifth attribute for comparison is the calculation of the moment of inertia of black pixels of the incoming and library characters about a horizontal centerline axis of rotation.

With the five foregoing attribute comparisons, parity detection has been found to be (99%) correct.

Upon the detection of a parity between an incoming block and a stored character block, the library address of the stored character is sent to a character match code circuit 128 which outputs the address via a lead 130 to the page storage circuit 40. The address sent from the character match code circuit 128 is sent in lieu of run length encoded data otherwise sent via the line 118. Thus, for a character block stored in the character library at each of the send and receive units 30, the information sent to the page storage element 40 would include the block location coordinates (x,y) and the library address only. The dimension of the block (i,j) and the block data from the run length encoder 116 would not be sent. Thus, it will be appreciated that when a library address is sent via the character match code circuit 128, the send/no send logic circuit 110 blocks the block dimension data (i,j) and sends only the planar coordinate location data (x,y) to the encoding logic circuit 112. Thus, the use of a character library scheme substantially further compresses the facsimile data to ratios approaching one hundred to one, ratios heretofore unheard of.

Referring now to FIG. 7, the circuit elements of the page storage and in-output control circuit element 40 of the unit 30 of the present invention are shown. The planar coordinate information (x,y) and the block size information (i,j) are provided via the bus 114 as one input to an address control element 132. Also connected to the address control element 132 is the data bus 118 and the block matching code bus 130. The information supplied via the busses 114, 118, and 130 are routed through the address control logic circuit 132 to a page storage memory 134 which accumulates and stores one or more separate pages of documents which are to be sent via the facsimile channel. The total number of pages to be stored in the page storage memory may be controlled by operation of the manual control circuit 44. An output of the page storage memory circuit 134 is supplied via an output buffer 136 to a parallel to serial converter 138. The serial data output from the parallel to serial converter 138 is then supplied to the modem 42 for transmission via the voice telephone circuit 34.

Referring to FIG. 8, the dial number and manual control circuit 44 is shown to be essentially of two parts: a dialer circuit 140 which is connected from a manual touch tone dial pad to the modem 42 to provide the desired communications path through the voice telephone circuit 34 in conventional fashion; and a page storage control circuit 142 which may be operatively connected to a manual touch tone dial pad or to a rotary pad for that matter and to the page storage memory 134. The page storage control circuit 142 establishes the number of documents that will be stored for transmission. This feature is important in that because of the speed of the units 30 of the present invention, it is possible to accumulate, for example, 20 pages for transmission via standard telephone lines in less than 1 minute. Thus it is necessary to have the compressed data for these pages preloaded into and available at the page storage memory 134 prior to dial up of the communications path in the voice telephone circuit 34 so that long distance tolls are thereby minimized.

Referring back to FIG. 1, at the receive end of the voice telephone circuit, the modem 42 receives incoming data sent via the telephone circuit 34 from the page storage and in-out control circuit 40 of the other unit 30, and it passes the incoming signal to the page storage and in-out control circuit 40 where the data is stored in the page storage memory 134 (FIG. 7). The address control 132 then separates the data in the page storage memory 134 into planar coordinates data (x,y), block size (i,j) data, and block match code addresses. This information is sent via the busses 114, 118, and 130 to an expander portion 144 of the compressor-expander circuit 38. The circuit elements of the expander 144 are shown in the block diagram of FIG. 9. Therein, the planar coordinate and block size data received from the bus 114 and the character match code data via the bus 110 are applied as inputs to an address control and mixer logic circuit 146. Initial character blocks are read into a character library memory 148 which in some preferred forms of the present invention may utilize the same memory circuit as that implementing the character library 120 of the compressor 66.

Received block data is supplied via the line 118 to a run length decoder 150 which functions to decode block data by run length to restore its original block data format. The run length decoder 150 is connected to an output buffer 152 which is operatively under the control of the address control and mixer logic circuit 146. The output buffer 152 may typically be a 4096 byte random access memory and stores up to forty scan lines. Typically 20 incoming scan lines would be written while 20 outgoing scan lines would be read out to the coupler circuit 36 operating in the receive mode (as shown in FIG. 3 and discussed in connection therewith). When the incoming data consists of planar coordinates, block size and block data all of this information is sent to, and stored in the output buffer 152. In the case of an incoming planar coordinate and character matching code address, a character block stored in the expander character library 148 is output in lieu of a signal from the run length decoder 150. The output from the character library 148 is also supplied directly to the output buffer 126.

Thus, it will be appreciated by those skilled in the art that the present invention accomplishes facsimile data compression to ratios heretofore unheard of. To those skilled in the art to which this invention relates, many changes in construction and widely differing embodiments and applications of the invention will suggest themselves without departing from the spirit and scope of the invention. The disclosures and the description herein are surely illustrative and are not intended to be in any sense limiting.

I claim:

1. In a method for sending binary facsimile data through a communications system including the steps of generating a binary facsimile signal by resolving black and white portions of a document to be transmitted into a binary sequence along sequentially parallel scan lines, sending said binary sequence over a communications link to a receiving location and creating a facsimile of said document in accordance with said sent binary sequence at said receiving location, a method of compressing said binary facsimile data for transmission over said link and expansion of said data at said receiving location, comprising the steps of compressing data for transmission by:
- locating in a memory a binary matrix of each individual character of said document;
- defining a rectangle around each said located matrix;
- sizing the rectangle to be the smallest possible size capable of surrounding said matrix and producing a coordinate location and rectangle size signal in accordance therewith;
- scanning said matrix within said sized rectangle to produce a binary sequence corresponding to the black and white portions of the character represented by said matrix;
- transmitting through said link said location and size signal and said binary sequence, and said facsimile signal expanding said compressed data sent to said receiving location by the steps of:
- converting each said sent location and size signal and said binary sequence into a binary matrix corresponding to a character;
- loading a memory storage with each said binary matrix in order;
- scanning said memory along sequentially parallel scan lines to provide a binary facsimile signal of each said character;
- converting said binary facsimile signal into a restored facsimile signal;
- using said restored facsimile signal to create a facsimile reproduction of said document.

2. The method set forth in claim 1 further comprising data compression steps of:
- creating from initial ones of said location and size signals and binary sequences identical libraries of scanned blocks of different characters at both sending and receiving ends, comparing subsequently scanned blocks at the transmitting end to test for character match;
- in the event of a character match, sending in lieu of said binary sequence, a library address; and
further comprising at said receiving location data expansion steps of:
- identifying sent library addresses;
- reading out a location signal and a binary sequence at said library address and supplying said readout in lieu of said location and size signal and binary sequence to said memory storage.

3. The method set forth in claim 1 further comprising a data compression step of encoding said binary sequence prior to transmitting and a data expansion step of decoding said sent and received encoded binary sequence prior to converting it into a said binary matrix.

4. The method set forth in claim 3 wherein said encoding and decoding steps employ run length binary encoding and decoding.

5. The method set forth in claim 1 further comprising a data compression step of encoding said coordinate location and rectangle size signal by a predetermined code prior to transmitting and a data expansion step of decoding said sent and received predetermined code encoded coordinate location and rectangle size signal prior to converting it into a said binary matrix.

6. In a binary facsimile communications system including a facsimile transmitter for generating a binary facsimile signal by resolving black and white portions of a document to be transmitted into a binary sequence along sequentially parallel scan lines, a communications link connected to said transmitter for sending said binary sequence to a facsimile receiver at a remote receiving location for creating a facsimile of said document in accordance with said sent binary sequence, a data compression device connected between said transmitter and said link and a data expansion device connected between said link and said receiver for data compression for transmission over said link and correlative data expansion at said receiving location, said data compression device comprising:
- transmit interface means for connecting said compression device to said transmitter;
- buffer memory means connected to said transmit interface means for storing a series of adjacent facsimile scan lines in binary format;
- memory scanning means connected to said buffer memory means for locating a binary matrix of each individual character of said document;
- character block definition means connected to said buffer memory means and to said memory scanning means for defining a rectangle around each said binary matrix located in said buffer memory;
- block dimension control means connected to said buffer memory means and said block definition means for sizing each said rectangle to the smallest size which will include said character therewith;
- block mapping means connected to said buffer memory means and to said block dimension control means for mapping the black and white portions of each said rectangle by scanning the area defined thereby to produce a binary sequence corresponding to black and white portions of the character represented thereby;
- transmission means connected to said memory scanning means, block dimension control means, said block mapping means, and to said communications link, for transmitting a data signal providing the location, size and contents of each said rectangle, and
said data expansion device comprising:
- reception interface means connected to said communications link for receiving said data signal sent by said transmission means;
- memory storage means connected to said reception interface means for storing a binary matrix of each said character of said document by placement therein of said decoded binary sequence for each said block at each location thereof;
- memory storage scanning means for scanning said memory along sequentially parallel scan lines to provide a binary facsimile signal;
- converter means connected to said memory storage scanning means for converting said binary facsimile signal into an analog facsimile signal;
- receive interface means connected to said converter means and to said facsimile receiver for providing said analog facsimile signal to said receiver, whereby a facsimile reproduction of said document may be made.

7. The apparatus set forth in claim 6 further comprising:
- transmit library memory means connected to said block mapping means for initially storing scanned blocks of different individual characters at predetermined known locations;
- receive library memory means connected to said converter means for initially storing said scanned blocks of different individual character matrices at said same predetermined known locations as in said transmit library memory means;

character comparator means connected to said transmit library memory means to said block mapping means and to said transmission means for comparing subsequently scanned blocks to test for character match and for sending a library address to said transmission means in lieu of said encoded binary sequence when a character matrix matches a character matrix stored in said transmit library means;

library identifier means connected to said converter means and to said receive memory means for identifying sent library addresses;

receive library memory said means connected to said receive library memory means and to said memory storage means for reading out to said memory storage means a library character matrix called in said receive library in said receive library memory means at an address provided by said library identifier means said library character matrix in lieu of an unsent decoded binary sequence.

8. The apparatus set forth in claim 6 further comprising binary data encoder means connected between said block mapping means and said transmission means of said data compression device, said encoder means for encoding said data signal prior to transmission thereof, and binary data decoder means connected between said reception interface means and said memory storage means of said data expansion device, said decoder means for decoding said sent and received encoded data signal.

9. The apparatus set forth in claim 8 wherein said binary data encoder means comprises run length encoder means, and wherein said binary data decoder means comprises run length decoder means.

10. The apparatus set forth in claim 6 further comprising location and size data encoding means connected between said block dimension control means and said transmission means, said location and size data encoding means for encoding the location and size of each said rectangle in accordance with a predetermined code, and location and size data decoding means connected between said reception interface means and said memory storage means, said location and size data decoding means for decoding in accordance with said predetermined code said location data and size data of each said sent and received rectangle.

* * * * *